June 13, 1950 W. H. T. HOLDEN 2,511,207
DYNAMOELECTRIC MACHINE
Original Filed March 24, 1944
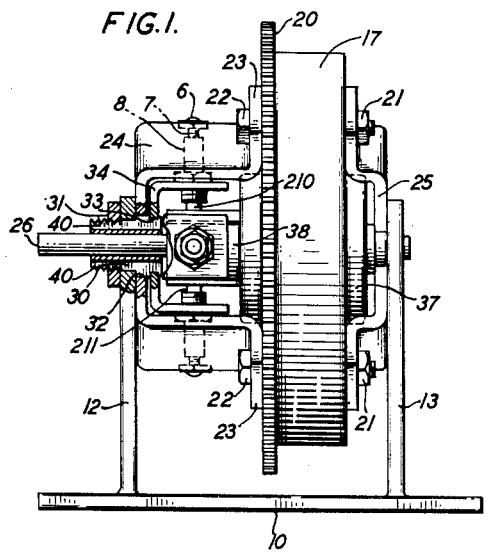
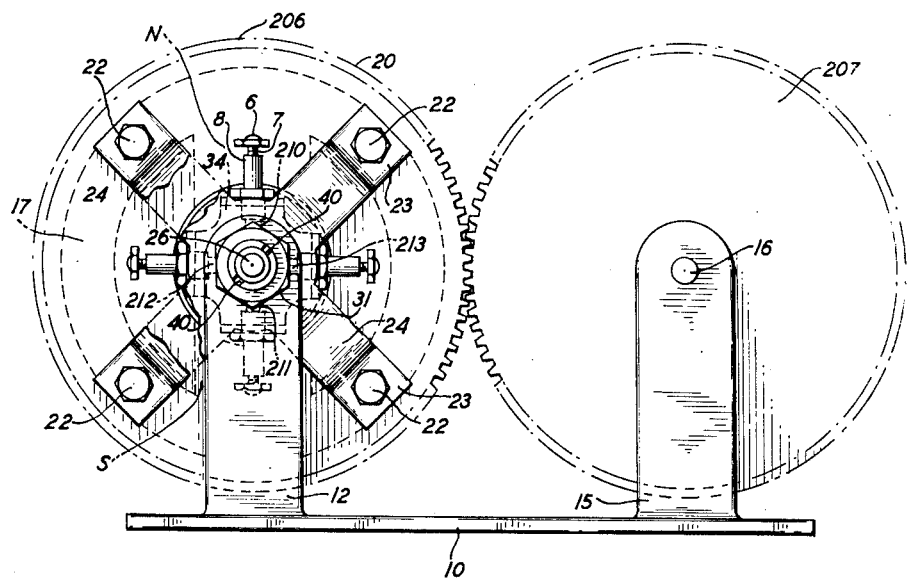
INVENTOR
W.H.T. HOLDEN
BY
*A. F. Kane*
ATTORNEY Patented June 13, 1950

2,511,207

UNITED STATES PATENT OFFICE 2,511,207

DYNAMOELECTRIC MACHINE

William H. T. Holden, Woodside, N. Y., assignor to Bell Telephone Laboratories, Incorporated, New York, N. Y., a corporation of New York Original application March 24, 1944, Serial No. 527,999. Divided and this application July 4, 1945, Serial No. 603,222

5 Claims. (Cl. 171—209)

1

This invention relates to a direct current generator and more particularly to a generator which is capable of generating a potential which may be varied at will in accordance with a trigonometric function of an angle. This application is a division of application, Serial No. 527,999, filed March 24, 1944, which issued as W. H. T. Holden Patent No. 2,434,270 on January 13, 1948.

It is frequently desirable to produce a potential which may be varied in accordance with a trigonometric function of an angle as, for instance, in accordance with the sine or cosine of an angle. An alternating current potential may be so varied through the use of a magnetic resolver having two stator windings positioned in quadrature and a rotor winding to which the potential which is to be resolved is applied and which rotor is rotatable through a desired angle, whereby a potential is derived from one stator winding which is a function of the potential applied to the rotor winding and the sine of the angle through which the rotor is rotated, and whereby a potential is derived from the other stator winding which is a function of the potential applied to the rotor winding and the cosine of the angle through which the rotor is rotated.

Another manner in which a sine or cosine product of either a direct or alternating current potential may be secured is by means of a potentiometer, the winding of which is wound on a card which is so shaped that as the associated brush is moved over the winding to an amount commensurate with an angular displacement, the potential produced at the point of engagement of the brush with the winding will vary in accordance with either the sine or cosine of the angular displacement of the brush dependent upon whether the winding is wound for the production of a sine or of a cosine function of the potential applied across the potentiometer winding.

It is the object of the present invention to provide an improved direct current generator of simple, compact construction, the generated potential of which may be resolved into sine and cosine components.

This object is attained in accordance with novel structural features incorporated in a direct current generator which insure the resolution of the potential generated thereby into sine and cosine components with a minimum number of parts which lend themselves to simplicity of design and compact assembly. More particularly, the generator of this invention comprises essentially two pairs of brushes positioned in quadrature with respect to each other, a bipolar field structure in the nature of a permanent magnet, and an armature and its associated commutator. The brushes may be mounted in a carrier rotatable with respect to the generator frame or preferably, and as disclosed in the illustrated embodiment, the brushes are fixedly mounted on the generator frame and the field of the generator is rotatable with respect thereto. With a generator thus constructed, it has been found that when the displacement of the brushes with respect to the polar axis of the field is equal to an angle, a potential may be derived across one pair of brushes which varies in accordance with the sine of the angle, and a potential may be derived across the other pair of brushes which varies in accordance with the cosine of the angle.

In the parent application of which this application is a division, the generator of this invention is employed as the master generator of an air position indicator, the generator being driven from the air mileage unit of an airplane at a speed commensurate with the air speed of the airplane and generating a potential across its polar axis equal to $E_0$, and a motor is operated to orient the brushes with respect to such polar axis through an angle $C_N$ equal to the true compass angle of the flight whereby the potential $E_1$ appearing across one pair of brushes is equal to $E_0 \sin C_N$ and the potential $E_2$ appearing across the other pair of brushes is equal to $E_0 \cos C_N$.

The generator of the present invention will now be described in detail and for this purpose reference is made to the accompanying drawing, in which:

Fig. 1 is an end elevation of the generator of this invention; and

Fig. 2 is a side elevation of the same which illustrates also the means, in the nature of an independently driven ring gear, which is employed in effecting a relative displacement of the generator brushes and the polar field axis.

In order to more clearly illustrate the relationship between the disclosure of the present application and that of the parent application several numerals of the latter are employed to designate similar elements in the present disclosure.

In the drawing, the generator frame is illustrated as a mounting bracket of non-magnetic material comprising a base 10 and two pairs of integrally formed arms extending vertically therefrom. The two pairs of arms are in alignment so that, in Fig. 1, only the arms 12 and 13 of one pair appear and in Fig. 2 only arm 12 of one pair and arm 15 of the other pair of arms appear. The two arms 15 (only one shown) serve to support the shaft 16 in suitable bearings which shaft rotatably supports the ring gear 207.

The bracket arm 12 is provided near its upper extremity with a cylindrical hole into which is fitted a rivet-like member 30 having a cylindrical bore which constitutes a bearing for the left portion (viewing Fig. 1) of the rotor shaft 26, the right end of the rotor shaft being journaled in a suitable bearing in the bracket arm 13.

A bushing or rivet-like member 30 serves as a means for fixedly supporting the brush carrier 34 on the frame member 12 and as a means for rotatably supporting the spider 24. The portion of the member 30 which extends to the right of the frame member 12 is provided with two annular flanges 32 and 33 of different diameters, the larger flange 32 constituting a bearing upon which the spider 24 rotates and the smaller flange 33 providing a seat for the support of the brush carrier 34. When the brush carrier 34 and the spider 24 are assembled on the member 30, as illustrated, the inner end of the member 30 is turned over or set and the nut 31 is screwed up on the threaded outer end thereof to clamp the assembly to the frame member 12. Sufficient clearance is provided between the brush carrier 34 and the spider 24 so as to permit the latter to freely rotate on the flange 32. The brush carrier 34 and the member 30 maintain a fixed position.

The spider 24 comprises a central portion, which rotates on the flange 32, from which four integrally formed arms project inwardly, each arm terminating in a flanged portion or foot 23. The flanged portions 23 occupy a common plane which is parallel to, and spaced from the plane of the central portion of the spider, and are each provided with a hole for the accommodation of a bolt 22. The four spider arms are disposed at 90 degrees from one another.

A second spider 25 is rotatably mounted on the right end of the rotor shaft 26 in a suitable bearing and is of substantially the same form as the spider 24 except that the inwardly projecting arms thereof are of shorter lengths. The flanged ends of this spider 25 are also provided with holes for the accommodation of the bolts 22.

The generator field structure comprises a ring-shaped permanent magnet 17 having two diametrically disposed inwardly projecting poles N and S. The pole faces of the poles N and S are approximately arcuate in contour so as to produce a flux distribution leading to accurate sine and cosine resolution. The permanent magnet 17 is provided with four equi-spaced holes through which the bolts 22 pass as will be described presently. An annular gear 20 having an outside diameter greater than that of the permanent magnet 17 is provided with four holes disposed similarly to the holes of the permanent magnet 17, and abuts the left face of the permanent magnet, viewing Fig. 1. The permanent magnet 17 and the gear 20 are assembled with their mounting holes in alignment and the two are then interposed between the flanged ends, or feet, of the spiders 24 and 25 so that the holes in the latter align themselves with the holes in the gear 20 and in the permanent magnet 17. The bolts 22 are then passed through the aligned holes of the spider flanges, gear and permanent magnet, and the nuts are then screwed up on the threaded ends thereof so as to effectively clamp the polar field unit between the spiders 24 and 25. The polar field structure and the spiders 24 and 25 thus become a unit rotatable independently of the rotor shaft 26 and relative to the stationary brush carrier 34. As illustrated in Fig. 2 the annular gear 20 is in constant mesh with the ring gear 207.

The brush carrier 34 comprises a central portion, which is seated on the flange 33 of the rivet-like member 30 and four integrally formed, inwardly projecting arms disposed in quadrature. Insulatedly supported in each arm of the brush carrier 34 is a brush holder 8 terminating in a threaded portion 7 on which is threaded a clamping nut 6 whereby a lead wire may be connected to the brush holder. A brush 210, 211, 212 or 213 is slidably supported in the brush holder, the inner end of which brush is forced into engagement with the rotor commutator 38 by the usual spring (not shown) which is interposed between the outer end of the brush and the outer end wall of the chamber within the holder 8. Lead wires from the generator brushes are brought out through suitable holes 40 in the bushing 30.

The generator rotor consists of the shaft 26, the armature 37 carried thereby and the commutator 38 secured thereto. The armature is rotatable between the poles N and S of the permanent magnet 17 and the commutator between the four brushes carried by the brush carrier 34.

By virtue of the meshing of the annular gear 20 with the ring gear 207 the permanent magnet 17 may be rotated relative to the generator brushes 210, 211, 212 and 213 when the ring gear 207 is driven by any suitable means.

The generator functions in the following manner: It will be assumed that the permanent magnet 17 has been rotated to a position in which its polar axis is aligned with the axis extending through the generator brushes 210 and 211 which is the position illustrated in Fig. 2. Since the axis of the brushes 212 and 213 is positioned in quadrature to the axis of brushes 210 and 211, the polar axis of the permanent magnet 17 will be 90 degrees out of positional phase with the axis of brushes 212 and 213. Under this condition and assuming the generator rotor to be rotating, a potential $E_0$ is generated between the brushes 210 and 211 while no potential appears across brushes 212 and 213. If the ring gear 207 is now rotated to cause the bipolar field of the generator to be rotated in a clockwise direction, viewing Fig. 2, from the position in which its polar axis is coincident with the axis of brushes 210 and 211 through an angle $C_N$, the field polar axis will move away from coincidence with the axis of brushes 210 and 211 and toward the axis of brushes 212 and 213 whereby the potential generated across brushes 210 and 211 is decreased and the potential generated across brushes 212 and 213 increases in a positive direction from zero. The potential generated across the brushes 210 and 211 may be expressed in terms of the maximum potential generated at the driven speed when the angle $C_N$ was zero as $E_3 = E_1 \sin C_N$ and the potential generated across the brushes 212 and 213 may be expressed in terms of the maximum potential generated thereby at the driven speed when the angle $C_N$ was 90 degrees as $E_4 = E_2 \cos C_N$. Thus when the angle $C_N$ equals zero the potential $E_3$ will be equal to $E_1$ and the potential $E_4$ will be zero and as the angle $C_N$ increases towards 90 degrees, potential $E_3$ will decrease until when the angle $C_N$ becomes 90 degrees the potential $E_3$ will be zero, and the potential $E_4$ will increase until the angle $C_N$ becomes 90 degrees, the potential $E_4$ will be equal to $E_2$.

As the polar field is further rotated so that the angle increases from 90 degrees toward 180 degrees the potential $E_4$, or $E_2 \cos C_N$ remains positive, but the potential $E_3$, or $E_1 \sin C_N$ becomes negative. As the polar field is further rotated so that the angle $C_N$ increases from 180 degrees toward 270 degrees the potential $E_3$, or $E_1 \sin C_N$ decreases from a negative value to zero and the potential $E_4$, or $E_2 \cos C_N$ increases from zero to a maximum value. As the polar field is rotated still further from 270 degrees toward 360 degrees the potential $E_4$, or $E_2 \cos C_N$ decreases from a negative value to zero and the potential $E_3$, or $E_1 \sin C_N$ increases from zero to a maximum positive value.

The generator of this invention has particular utility in an air position indicator of the type disclosed in the parent application. When used in such a system, the generator is driven from the air mileage unit of the airplane so that the potentials generated at the two sets of brushes 210, 211 and 212 213 would constitute reference potentials commensurate with the air speed of the airplane and the ring gear 207 would be operated by the compass servo-motor to orient the permanent magnet 17 in accordance with the true compass course angle of the airplane flight. This use of the generator is to be considered only as illustrative and not as limiting it in any manner to such specific use.

A particular advantage of the generator of this invention is its low impedance when compared to devices of the prior art such as described on page 1. Furthermore, the conversion of a function such as velocity or position into an electrical voltage and its resolution into components are accomplished in a single unitary structure.

What is claimed is:

1. In combination, a direct current generator comprising a stationary frame, a bipolar permanent magnet field structure, a rotor having a winding and a commutator, a pair of commutator brushes fixedly supported on the stationary frame of said generator, and means for rotatably displacing said field structure with respect to said frame whereby a generated potential is attained across said brushes which varies with the speed of rotation of said rotor and with a trigonometric function of the angle through which said field structure is rotated.

2. In combination, a direct current generator having a bipolar permanent magnet field structure, a rotor having a winding and a commutator, two pairs of commutator brushes positioned in quadrature and fixedly supported on the frame of said generator, and means for rotatably displacing said field structure with respect to said frame whereby a potential is attained across one pair of said brushes which varies with the speed of rotation of said rotor and with the sine of the angle of displacement, and whereby a potential is attained across the other pair of said brushes which varies with the speed of rotation of said rotor and with the cosine of the angle of displacement.

3. In combination, a direct current generator having a bipolar flux-producing field structure, a rotor having a winding and a commutator, two pairs of commutator brushes, means for fixedly supporting said brushes in quadrature with respect to each other, rotatable means supporting said field structure, and means for rotating said rotatable supporting means relative to said brush supporting means whereby the position of said field structure is angularly displaced relative to said pairs of brushes.

4. In combination, a direct current generator having a bipolar flux-producing field structure, a rotor having a winding and a commutator, two pairs of commutator brushes, means for fixedly supporting said brushes in quadrature with respect to each other, means for mounting said field structure for rotation in either direction through arcs up to and exceeding 360 degrees, and means for rotating said mounting means whereby the position of said field structure is angularly displaced relative to said brushes.

5. A generator capable of providing a plurality of terminal potentials of different polarities having values which bear a trigonometric relationship to one another comprising a fixed mounting, a rotor supported on said mounting comprising an armature winding and a commutator, a ring-shaped permanent magnet encircling said rotor and provided with two diametrically disposed inwardly projecting integral poles, the faces of which are disposed in close proximity to the armature of said rotor, means mounting said permanent magnet on said frame for rotation through a complete revolution relative to said rotor, a brush carrier rigidly fixed to said frame comprising four integral arms disposed in quadrature in telescopic relation to the commutator of said rotor, a brush holder carried by each arm of said carrier, and a brush supported in each of said brush holders in engagement with said commutator.

WILLIAM H. T. HOLDEN.

REFERENCES CITED

The following references are of record in the file of this patent:

UNITED STATES PATENTS

| Number | Name | Date |
| --- | --- | --- |
| 423,909 | Cooley | Mar. 25, 1890 |
| 488,261 | Bogue | Dec. 20, 1892 |
| 699,388 | Hutchins | May 6, 1902 |
| 2,418,471 | Holden et al. | Apr. 8, 1947 |

OTHER REFERENCES

"The Dynamo" vol. 2—by C. C. Hawkins— published by Sir. Isaac Pitman & Sons, Ltd., 1923.